United States Patent [19]

Galloway

[11] Patent Number: 4,650,743

[45] Date of Patent: Mar. 17, 1987

[54] OPTICAL COATING COMPOSITION

[75] Inventor: Lory Galloway, Wilmington, Del.

[73] Assignee: E. I. Du Pont de Nemours and Company, Wilmington, Del.

[21] Appl. No.: 760,946

[22] Filed: Jul. 31, 1985

[51] Int. Cl.$^4$ .................... G01D 15/14; G03C 1/76; G03C 1/94

[52] U.S. Cl. .................... 430/278; 430/270; 430/271; 430/273; 430/945; 428/64; 428/195; 428/913; 428/914; 346/135.1; 346/76 L

[58] Field of Search .................... 346/135.1, 76 L; 430/945, 271, 270, 273, 278; 428/64, 195, 913, 914

[56] References Cited

U.S. PATENT DOCUMENTS

| | | | |
|---|---|---|---|
| 4,101,907 | 7/1978 | Bell et al. | 346/135.1 |
| 4,188,433 | 2/1980 | Dijkstra et al. | 428/332 X |
| 4,268,575 | 5/1981 | Shinozaki et al. | 346/135.1 |
| 4,492,718 | 1/1985 | Mayer et al. | 427/54.1 |

FOREIGN PATENT DOCUMENTS

85/01227  3/1985  PCT Int'l Appl. .............. 430/945

OTHER PUBLICATIONS

Abraham Goldman, "Overcoat for Optical Disc Recording", *Technical Notes*, No. 1352, RCA, Princeton, N.J., Jun. 4, 1984, 2 pages.

*Primary Examiner*—John E. Kittle
*Assistant Examiner*—Cynthia Hamilton

[57] ABSTRACT

An optical coating composition comprising a $C_{1-3}$ hydroxyalkyl monofunctional acrylate monomer having dissolved therein an oligomer having a molecular weight of at least 500 and a photoinitiator system.

8 Claims, No Drawings

OPTICAL COATING COMPOSITION

FIELD OF INVENTION

The invention relates to a composition for forming optical layers particularly for use in the manufacture of optical recording media.

BACKGROUND OF THE INVENTION

In response to the demand for more reliable and higher capacity data storage and retrieval systems, there is considerable activity in the research and development of so-called optical disk recording systems. These systems utilize a highly focused modulated beam of light, such as a laser beam, which is directed onto a recording layer which is capable of absorbing a substantial amount of the light. The heat thusly produced causes the light-absorbing material in the areas struck by the highly focused laser beam to change chemically and/or physically, thus producing a concomitant change in optical properties, e.g., transmissivity or reflectivity, in the affected area. For readout, the contrast between the amount of light transmitted or reflected from the unaffected parts of the absorbing layer and from the marked areas of the layer is measured. Examples of such recording systems are disclosed throughout the literature and in numerous U.S. Patents such as U.S. Pat. Nos. 3,314,073 and 3,474,457. In recording data, a rotating disk having a light-absorptive recording layer is exposed to modulated radiation from a laser source. This radiation is passed through a modulator and appropriate optics, and the highly focused laser beam is directed onto the disk which forms by chemical and/or physical reaction of the light-absorbing layer a series of very small marks along a circular path within the light-absorptive layer. The frequency of the marks is determined by the modulator inputs. Using laser beams with a focused spot diameter of 1 $\mu$m or less, data can be stored at a density of $10^8$ bits/cm$^2$ or higher.

The simplest optical disk medium consists merely of a dimensionally stable solid substrate on which is coated a thin layer of light-absorptive material such as a metal layer. When the light-absorptive layer is struck by an intense beam of coherent light, such as from a laser source, the light-absorptive material is either vaporized and/or thermally degraded, thereby producing a very small marked area which exhibits different transmissivity or reflectivity than the adjacent unmarked layer. Multilayer antireflection structures, such as those disclosed in U.S. Pat. No. 4,305,081 to Spong and U.S. Pat. No. 4,270,132 to Bell, increase the absorption of the laser beam which also gives better read/write contrast than with the use of simple single layer media. Therefore, for purposes of obtaining better power efficiency, sensitivity and readout response of the record, it has been preferred to use multilayer antireflective structures.

There are two basic types of multilayer antireflective structures, one of which is basically a bilayer structure and the other a trilayer structure. In bilayer media, the substrate is coated with a very smooth, highly reflective material such as aluminum, on top of which is coated a layer of moderately light-absorptive material which is preferably of a thickness corresponding to about $\lambda/4n$, where $\lambda$ is the wavelength of the recording light source and n is the refractive index of the light-absorptive layer. In trilayer media, the substrate is likewise coated with a first layer of very smooth highly reflective material on which is coated a second layer of transparent material. Atop the transparent second layer is coated a thin third layer of strongly light-absorptive material. The combined thickness of the transparent and absorptive layers is preferably adjusted to be about $\lambda/4n$. In both types of structures, the adjustment of certain layer thicknesses according to the wavelength of light and refractive index of the layer is for the purpose of minimizing the amount of light reflected from the unmarked areas and maximizing the amount of light reflected from the marked areas, thus producing a higher playback signal amplitude. A detailed discussion of the three types of disk construction is given by A. E. Bell in *Computer Design*. Jan. 1983, pp. 133–146 and the references cited therein. See especially Bell and Spong, *IEEE Journal of Quantum Electronics*, Vol. QE-14, 1978, pp. 487–495.

It will be realized, of course, that the terms "bilayer" and "trilayer" refer only to the fundamental optical layers and do not exclude the use of ancillary layers. In particular, it is essential in most instances to have a polymeric layer which serves two important functions: (1) the layer must be optically smooth in order to provide an optically suitable foundation for the overlying reflective layer; and (2) the layer must have good adhesion to the underlying substrate as well as the overlying reflective layer. Furthermore, these properties must persist under all the environmental conditions which may exist as the medium is used and stored.

PRIOR ART

U.S. Pat. No. 4,188,433, Dijkstra et al.

Dijkstra et al. disclose a laser beam recording medium in which the energy absorbing recording layer is protected by a cured layer of UV-curable lacquer which serves as an adhesive layer and an overlying layer of transparent resin. The lacquer is preferably a mixture of protic acrylic acid esters such as hydroxyalkyl or aminoalkyl acrylates. The overlying resin layer can be made of any of several transparent resins, including poly(methylmethacrylate).

U.S. Pat. No. 3,665,483, Becker et al.

This patent is directed to a laser beam recording medium in which the energy-absorbing recording layer is protected with an overlying transparent layer of SiO$_2$. It is disclosed that if the SiO$_2$ is thick enough, it can displace surface dust and dirt from the focal plane of the laser beam.

U.S. Pat. No. 3,911,444, Lou et al.

The Lou et al. patent is directed to a laser beam recording medium in which the energy-absorbing recording layer is coated upon an underlying layer of poly(alkyl methacrylate) or fluorinated polyethylene.

U.S. Pat. No. 4,300,143, Bell et al.

The Bell et al. patent is directed to an optical recording medium in which the recording layer is protected by an adjoining transparent layer of organic or inorganic material.

U.S. Pat. No. 4,477,328, Broeksemer et al.

This patent discloses a liquid coating for use on optical recording disks comprising a solution of acrylate or methacrylate oligomers and photoinitiator having a viscosity of 1000–15000 cP. Preferred oligomers are indicated to have a molecular weight of 300–1000. Only alkylene-bis(phenoxyalkylacrylate) and alkylene-bis(phenoxyalkylmethacrylate) are disclosed.

U.S. Pat. No. 4,492,718, Mayer et al.

The Mayer patent discloses rotation coating of optical disk substrates with compositions containing acrylate prepolymers, a mixture of triacrylate monomer, monoacrylate monomer, surfactant and initiator. One composition is disclosed which contains only a high molecular weight acrylate oligomer, 2-ethylhexyl acrylate, surfactant and initiator. No compositions are disclosed which use oligomers having molecular weights below 1000.

BRIEF DESCRIPTION OF THE INVENTION

In a primary aspect, the invention is directed to an optical coating composition comprising a solution of:
a. liquid hydroxy-lower alkyl monoacrylate having dissolved therein
b. oligomer having a molecular weight of at least 500; and
c. 0.05–10% wt. photoinitiator system, the liquid uncured solution having a viscosity of at least 10 cP and surface tension of less than 36 dynes/cm at coating temperature and the solid cured composition having a transmissivity of at least 88% to light having a wavelength of 488–830 nm and a pencil hardness of at least 2B.

In a second aspect, the invention is directed to
(1) applying to the substrate a liquid layer of the above-described coating composition at a temperature such that the viscosity of the composition is 10–100 cP; and
(2) exposing the coated layer to actinic radiation for a time sufficient to effect substantially complete photohardening of the acrylic monomer.

In a third aspect, the invention is directed to an optical recording medium comprising:
a. a dimensionally stable substrate;
b. a layer of light-absorptive material; and
c. an optical layer coated on layer b. by the method described above.

Except as the terms are applied to specifically named compounds, the terms "acrylic" and "acrylate" are intended herein to encompass both acrylic ($R_2C=C-$) and methacrylic

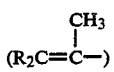

moieties.

DETAILED DESCRIPTION OF THE INVENTION

A. Photohardenable Monomer

In applicant's copending U.S. patent application Ser. No. 760,947, filed concurrently herewith, it is disclosed that suitable monomers for making optical coating compositions must meet each of the following five criteria:
(1) No less than 4 carbon atoms in the ester group;
(2) Mutual solubility with the oligomer;
(3) Liquidity at room temperature; and
(4) Monofunctionality.

Because the composition of the invention contains no volatile solvents and because the acrylate monomer also serves as the dispersion medium for the oligomer and the photoinitiation system and since the composition must be liquid at whatever temperature it is coated and preferably at room temperature, the monomer must also be liquid at ambient room temperature. All of the hydroxy-lower alkyl acrylates used herein are liquid at room temperature.

Notwithstanding the general criticality of molecular size with respect to the number of carbon atoms in the monoacrylates of that corresponding application, it has been found quite unexpectedly that monofunctional acrylates having fewer than four carbon atoms are nevertheless quite useful so long as they are substituted with at least one hydroxy group. Thus, suitable primary monofunctional acrylate monomers include the following:

hydroxymethyl acrylate
hydroxymethyl methacrylate
1-hydroxyethyl acrylate
2-hydroxyethyl acrylate (HEA)
1-hydroxyethyl methacrylate
2-hydroxyethyl methacrylate (HEMA)
1-hydroxypropyl acrylate
2-hydroxypropyl acrylate (2-HPA)
3-hydroxypropyl acrylate
1-hydroxypropyl methacrylate
2-hydroxypropyl methacrylate
3-hydroxypropyl methacrylate
1-hydroxyisopropyl acrylate
2-hydroxyisopropyl acrylate
1-hydroxyisopropyl methacrylate
2-hydroxyisopropyl methacrylate
dihydroxymethyl acrylate
dihydroxymethyl methacrylate
1,2-dihydroxyethyl acrylate
1,2-dihydroxyethyl methacrylate
1-methyl-2,2-dihydroxyethyl acrylate
1-methyl-2,2-dihydroxyethyl methacrylate
1-hydroxymethyl-2-hydroxyethyl acrylate
1-hydroxymethyl-2-hydroxyethyl methacrylate
2,2-dihydroxyethyl acrylate
2,2-dihydroxyethyl methacrylate
1-methyl-1,2-dihydroxyethyl acrylate
1-methyl-1,2-dihydroxyethyl methacrylate
3,3-dihydroxypropyl acrylate
3,3-dihydroxypropyl methacrylate
1,3-dihydroxypropyl acrylate
1,3-dihydroxypropyl methacrylate
2,2-dihydroxypropyl acrylate
2,2-dihydroxypropyl methacrylate
1,2-dihydroxypropyl acrylate
1,2-dihydroxypropyl methacrylate
1,1-dihydroxypropyl acrylate
1,1-dihydroxypropyl methacrylate All of the above-listed monomers are liquid at room temperature and are compatible with (mutually soluble in) the oligomer and initiator components of the compositions of the invention.

As is pointed out in the above-referred copending application, polyfunctional acrylates are not suitable except in small amounts for the reason that the photohardened monomers incur excessive shrinkage and thus degrade adhesion. Despite their unsuitability as primary monomers, multifunctional acrylate monomers and solid monofunctional acrylate monomers can be used in quantities up to about 10% wt. of the total monomer content so long as they meet the other criteria listed above. It is, however, preferred to use not more than about 5% wt.

B. Oligomer

The oligomer component of the composition is a primary tool to adjust the physical properties of the composition. In particular, it is a means for adjusting the viscosity of the coating composition and to adjust the hardness and other physical properties of the photohardened layer. Thus, so long as the oligomer is completely soluble in the acrylic monomer, its chemical composition is not narrowly critical. Thus, polyacrylates, epoxy resins, polyurethanes, aminoplast resins and phenolic resins can all be used as the oligomer component of the compositions of the invention. As used herein, the term "oligomer" refers to either linear or nonlinear polymers having from 2 to 10 repeating units.

When acrylate oligomers are used, they may be either monofunctional or polyfunctional. thus they can be oligomers of any of the above-described monofunctional acrylate monomers or they can be oligomers of acrylate monomers which do not meet the above-described five criteria. For example, suitable monomers that do not meet these criteria are:

1,4-butanediol dimethacrylate,
1,6-hexanediol diacrylate,
1,6-hexanediol dimethacrylate,
n-laural acrylate,
n-lauryl methacrylate,
methyl methacrylate,
2-methoxymethylethyl acrylate,
neopentylglycol dimethacrylate,
octodecyl acrylate,
octadecyl methacrylate,
polyethyleneglycol dimethacrylate,
tetrahydrofurfural acrylate,
trimethylolpropane triacrylate,
tripropyleneglycol diacrylate,
1,5-pentanediol diacrylate,
N,N-diethylaminoethyl acrylate,
ethylene glycol diacrylate,
1,4-butanediol diacrylate,
diethylene glycol diacrylate,
1,3-propanediol diacrylate,
decamethylene glycol diacrylate,
decamethylene glycol dimethacrylate,
1,4-cyclohexanediol diacrylate,
2,2-dimethylol propane diacrylate,
glycerol diacrylate,
glycerol triacrylate,
pentaerythritol triacrylate,
2,2-di(p-hydroxyphenyl)-propane diacrylate,
pentaerythritol tetraacrylate,
2,2-di(p-hydroxyphenyl)-propane dimethacrylate,
triethylene glycol diacrylate
polyoxyethyl-2,2-di(p-hydroxyphenyl)-propane dimethacrylate
di-(3-methacryloxy-2-hydroxypropyl) ether of bisphenol-A,
di-(2-methacryloxyethyl) ether of bisphenol-A,
di-(3-acryloxy-2-hydroxypropyl) ether of bisphenol-A,
di-(2-acryloxyethyl) ether of bisphenol-A,
di-(3-methacryloxy-2-hydroxypropyl) ether of tetrachloro-bisphenol-A,
di-(2-methacryloxyethyl) ether of tetrachlorobisphenol-A, di-(3-methacryloxy-2-hydroxypropyl) ether of tetrabromo-bisphenol-A,
di-(2-methacryloxyethyl) ether of tetrabromobisphenol-A,
di-(3-methacryloxy-2-hydroxypropyl) ether of 1,4-butanediol,
di-(3-methacryloxy-2-hydroxypropyl) ether of diphenolic acid,
triethylene glycol dimethacrylate, polyoxypropyltrimethylol propane triacrylate (462)
ethylene glycol dimethacrylate
butylene glycol dimethacrylate
1,3-propanediol dimethacrylate
1,2,4-butanetriol trimethacrylate
2,2,4-trimethyl-1,3-pentanediol dimethacrylate
pentaerythritol trimethacrylate
1-phenyl ethylene-1,2-dimethacrylate
pentaerythritol tetramethacrylate trimethylol propane trimethacrylate and 1,5-pentanediol dimethacrylate.

Epoxy resins that can be used in the composition include those having the formula

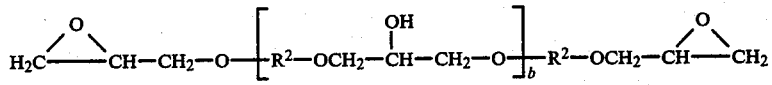

where b is a positive integer of about 1 to 4. Preferably, the epoxy resin is the polymerization product of epichlorohydrin and bisphenol-A. In a preferred epoxy resin, $R^2$ in the above formula is

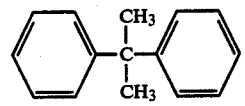

Typical of these preferred epoxy resins is Epon 828 ® having an equivalent weight of about 185-192, manufactured by Shell Chemical Company, Houston, TX and DER 331 having an equivalent weight of about 182-190, manufactured by The Dow Chemical Company, Midland, MI. The equivalent weight is the grams of resin that contain one gram equivalent of epoxide.

An epoxy novolac resin that can be used in the composition has the formula

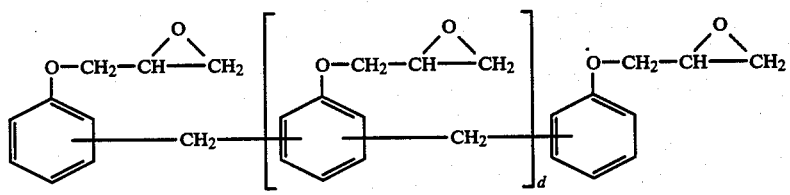

where d is a positive integer of about 1-2. Preferred epoxy novolac resin are DEN 431 where d has an average value of 0.2, DEN 438 where d has an average value of 1.6 and DEN 439 where d has an average value of 1.8. These resins are also manufactured by The Dow Chemical Company.

A wide variety of liquid cross-linking resins can be used as the oligomeric component for the invention, including thermosetting resins such as aminoplast resins, phenolic resins, blocked polyisocyanates and masked isocyanates.

The aminoplast resins used may be alkylated methylol melamine resins, alkylated methylol urea, and similar compounds. Products obtained from the reaction of alcohols and formaldehyde with melamine, urea or benzoguanamine are most common and are preferred herein. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like.

While the aldehyde employed is most often formaldehyde, other similar condensation products can be made from other aldehydes, such as acetaldehyde, crotonaldehyde, acrolein, benzaldehyde, furfural, glycols and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cellosolves and Carbitols, and halogen-substituted or other substituted alcohols, such as 3-chloropropanol and butoxyethanol. The preferred aminoplast resins are substantially etherified with methanol or butanol.

The phenolic resins which may be used herein are formed by the condensation of an aldehyde and a phenol. The most used aldehyde is formaldehyde, although other aldehydes, such as acetaldehyde, can also be employed. Methylene-releasing and aldehyde-releasing agents, such as paraformaldehyde and hexamethylene tetramine, can be utilized as the aldehyde agent if desired. Various phenols can be used; for instance, the phenol employed can be phenol itself, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenyl-phenol, p-tert-butyl-phenol, p-tert-amylphenol, cyclopentylphenyl and unsaturated hydrocarbon-substituted phenols, such as the monobutenyl phenols containing a butenyl group in ortho, meta or para position, and where the double bond occurs in various positions in the hydrocarbon chain. A common phenol resin is phenol formaldehyde.

Particularly preferred types of phenolic resins are the alkyl ethers of mono-, di- and tri-methylol phenols.

Various forms of these resins are described in U.S. Pat. Nos. 2,579,329, 2,579,330, 2,579,331, 2,598,406, 2,606,929, 2,606,935 and 2,825,712. These materials are sold under the tradename Methylon ® resins by General Electric Co., Schenectady, NY.

Blocked organic polyisocyanate may be used as the oligomeric component herein. The conventional organic polyisocyanates, as described above, which are blocked with a volatile alcohol, ε-caprolactam, ketoximes or the like, so that they will be unblocked at temperatures above 100° C. may be used. These curing agents are well known in the art.

A masked polyisocyanate may also be used as the curing agent. These masked polyisocyanates, as is known in the art, are not derived from isocyanates but do produce isocyanate groups upon heating at elevated temperatures. Examples of useful masked polyisocyanates include diaminimides

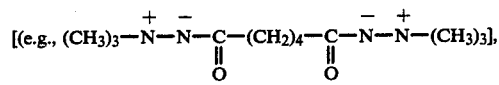

adiponitrile dicarbonate, and the like.

C. Photoinitiation System

Suitable photoinitiation systems are those which are thermally inactive but which generate free radicals upon exposure to actinic light at or below 185° C. These include the substituted or unsubstituted polynuclear quinones which are compounds having two intracyclic carbon atoms in a conjugated carbocyclic ring system, e.g., 9,10-anthraquinone, 2-methylanthraquinone, 2-ethylanthraquinone, 2-tert-butylanthraquinone, octamethylanthraquinone, 1,4-naphthoquinone, 9,10-phenanthrenequinone, benz(a)anthracene-7,12-dione, 2,3-naphthacene-5,12-dione, 2-methyl-1,4-naphthoquinone, 1,4-dimethylanthraquinone, 2,3-dimethylanthraquinone, 2-phenylanthraquinone, 2,3-diphenylanthraquinone, retenequinone, 7,8,9,10-tetrahydronaphthacene-5,12-dione, and 1,2,3,4-tetrahydrobenz(a)anthracene-7,12-dione. Other photoinitiators which are also useful, even though some may be thermally active at temperatures as low as 85° C., are described in U.S. Pat. No. 2,760,863 and include vicinal ketaldonyl alcohols such as benzoin, pivaloin, acyloin ethers, e.g., benzoin methyl and ethyl ethers; α-hydrocarbon-substituted aromatic acyloins, including α-methylbenzoin, α-allylbenzoin and α-phenylbenzoin. Photoreducible dyes and reducing agents disclosed in U.S. Pat. Nos. 2,850,445, 2,875,047, 3,097,096, 3,074,974, 3,097,097, and 3,145,104, as well as dyes of the phenazine, oxazine, and quinone classes, Michler's ketone, benzophenone, 2,4,5-triphenylimidazolyl dimers with hydrogen donors including leuco dyes and mixtures thereof as described in U.S. Pat. Nos. 3,427,161, 3,479,185 and 3,549,367 can be used as initiators. Also useful with photoinitiators and photoinhibitors are sensitizers disclosed in U.S. Pat. No. 4,162,162. The photoinitiator or photoinitiator system is present in 0.05 to 10% by weight based on the total weight of the dry photopolymerizable layer.

E. Formulation

In formulating the coating compositions of the invention, the order of mixing is not important. In general, they can be formulated most easily by adding the oligomer, which may be either a viscous liquid or a soft solid, and the photoinitiator system, which is normally solvent, to the liquid monomer and then agitating the mixture well to effect complete solution of all the components. This is the procedure which was used to prepare each of the coating compositions which are described in the examples.

As indicated above, it is important that the viscosity of the coating composition be suitable for the coating method by which it will be applied. When the composition is applied to a substrate by spin coating, the viscosity of the solution should be 10–100 centipoises (cP). However, if the composition is applied by other means, its viscosity can be much higher. For example, if the composition is applied by curtain coating, the viscosity might be as high as 3000 cP. The viscosity of the coating composition can be adjusted by changing the relative amounts of monomer and oligomer. The amount of oligomer may be as low as only about 1% wt. of the composition when low viscosity coating methods are used, but they may also be as much as 50% wt. for high viscosity coating methods. The photoinitiator system does not exert any significant effect on solution viscosity.

Another important property of the composition of the invention is its surface tension, which must be less than 30 dynes/cm in order to obtain proper wetting of the substrate with the coating. In many instances the solution of monomer, oligomer and initiator will have the proper surface tension. However, in those instances where the solution has too high surface tension, it can be lowered by the addition of a small amount of a soluble nonionic surfactant. Fluorinated glycol-type oligomers such as oligomers of fluorinated acrylate esters have been found to be most suitable for this purpose. Many others may, however, be used as well. Even when all of the foregoing monomer criteria are carefully observed, it is still necessary to formulate the composition to ensure that the cured composition has a hardness of at least 2B. The reason for this is that cured coatings softer than 2B have poor substrate adhesion.

The composition of the invention can in exceptional instances contain dispersed finely divided solids, e.g., polymeric solids, so long as the index of refraction of the solids matches that of the cured matrix in which they are dispersed. Such particles must, however, be very small, on the order of 100 Å or less. The inclusion of such materials can advantageously be used to reduce shrinkage of the coatings still further.

F. Test Procedures

In the examples, the following described test procedures were used:

1. Viscosity

Procedure 1: 1.2 ml of material is introduced into a Wells-Brookfield Model RVT Ser. No. 27814 microviscometer fitted with constant-temperature water bath. All measurements are made at 25° C. After a 1 minute temperature equilibration period, three viscosity readings are recorded at 1 minute intervals. The procedure is repeated for two additional 1.2 ml aliquots for a total of nine readings. All readings are taken at 100 RPM. The material viscosity is reported as the average of the nine readings.

Procedure 2: 8.0 ml of material is introduced into a Brookfield Model LVTD Ser. No. A01770 digital viscometer fitted with "small adaptor," LV spindle, and Endocal Model RTE-9DD refrigerated circulating bath. All measurements are made at 25° C. After a 3 minute temperature equilibration period, a single viscosity reading is recorded at each of the following spindle speeds: 60, 30, 12, 12, 30, 60 RPM. The procedure is repeated for one additional 8.0 ml sample or a total of twelve readings. The material viscosity is reported as the average of the twelve readings.

2. Filtration Procedure

Batches of material are filtered through 0.1 μm nominal and 0.2 μm absolute polypropylene filters arranged in series. Filters are cartridge-type purchased from Membrama, Inc., Pleasanton, CA 94566. Pressure ≦5 psi is required for the filtration process.

3. UV Curing and Percent Transmission of Films

The material is cast onto 8"×12" double weight window pane glass using an 8 mil doctor blade (4" wide). The material is cured on a conveyorized UV source (~6 ft/minute; ~6 j/cm$^2$) without a nitrogen blanket. Photospeed is indicated as the number of passes of the UV lamp a sample requires to completely cure. Films are carefully peeled from the glass surface, cut to ~2"×2", and placed in a Perkin-Elmer Model 330 spectrophotometer for percent transmission determination. Percent transmission is recorded at 632.8 nm, 780 nm, and 830 nm. Six measurements at each wavelength are recorded. The film is removed and reinserted into the sample compartment between each measurement. The instrument is zeroed prior to each insertion of the film sample. The % T is read off the digital display. The percent transmission at each wavelength is reported as the average of the six measurements.

4. Surface Tension

Approximately 50 ml of material is poured into a 4-ounce clear straight-shoulder glass jar for use in the surface tension measurement. Six measurements are made at room temperature according to the instruction manual for the Fisher Model 21 Surface Tensiomat. The surface tension (dynes/cm) is reported as the average of the six measurements.

5. Percent Photoinitiator

A 1 mm path length quartz spectrophotometer cell is filled with material and inserted into the sample compartment of Perkin-Elmer Model 330 spectrophotometer zeroed at 340 nm (absorption mode). An empty 1 mm cell is placed in the reference compartment. The optical density (OD) of the material is read off the digital display. The optical density at 350 nm is directly proportional to the percent photoinitiator as follows:

| OD | % Photoinitiator (Irgacure 651) |
|---|---|
| 3.195 | 2.68 |
| 2.940 | 2.46 |

6. Index of Refraction

Index of refraction of both solutions and films are measured according to the instructions provided for a Fisher Abbe Refractometer cooled at 20° C. using a temperature-controlled water bath.

7. Pencil Hardness

In this text, pencil leads of increasing hardness values are forced against a coated surface in a precisely defined manner until one lead mars the surface. Surface hardness is defined by the hardest pencil grade which just fails to mar the painted surface.

Leads, softest to hardest, are as follows: 6B, 5B, 4B, 3B, 2B, B, HB, F, H, 2H, 3H, 4H, 5H, 6H, 7H, 8H, 9H.

Begin testing using a Gardco ® pencil hardness gage and the hardest pencil. Grasp the holder firmly and bring the tube end down onto the test surface. Rotate until the selected pencil is nearest the operator and then incline the assembly downward until the lead point and the tube end are simultaneously in contact with the surface. This defines the correct lead angle of 45° to the surface. Push the gage forward (away) about one-half inch. Observe the pencil track. Sufficient pressure must have been applied either to cut or mar the film or to crush the sharp corner of the lead. If neither marring nor crushing is observed, repeat the test with greater pressure applied until a definite observation is made. If crushing of the hardest lead should occur, the film is extremely hard and is beyond the measuring range of the test. If scratching or marring of the film occurs, proceed with the next softer pencil grade and repeat the testing process until a test lead is found which crushes and does not mar the film. This is the pencil hardness of the film.

In the examples, the listed numbers and abbreviations refer to particular proprietary materials as indicated below:

A. Epoxy (acrylated epoxy) Oligomer

The following numbers refer to Celrad oligomers: 3201, 3500, 3600, 3700, 3701, 3702, 3703.

B. Acrylate (acrylated acrylate) Oligomer

The following number refers to Celrad oligomer: 6700.

C. Urethane (acrylated urethane) Oligomer

The following number refers to a urethane oligomer: UV 783.

The following numbers refer to Celrad oligomers: 1700, 7100.

D. Surfactant

FC-430 Fluorad FC-430

In the examples the following qualitative designations are used for the flexibility, adhesion and surface texture measurements.

| Flexibility: | 1 | Flexible |
| | 2 | Moderately flexible |
| | 3 | Moderately brittle |
| | 4 | Brittle |
| Adhesion: | 1 | Poor |
| | 2 | Fair |
| | 3 | Good |
| | 4 | Excellent |
| Surface Texture: | 0 | None |
| | 1 | Slight |
| | 2 | Some |
| | 3 | Pronounced/crazed |

EXAMPLES

EXAMPLES 1-27

Several series of compositions were prepared and tested in the manner described hereinabove. In particular, these series were designed to show the efficacy of the hydroxy-lower alkyl acrylates with a variety of oligomeric substances at various concentrations.

| Example Numbers | Oligomer Type |
|---|---|
| 1-19 | Epoxy |
| 20-21 | Acrylate |
| 22-27 | Urethane |

The data on the coatings produced therefrom are given in Table 1 which follows:

TABLE 1
EFFECT OF COMPOSITIONAL VARIABLES ON COATING PROPERTIES

| EXAMPLE NO. | | 1 | 2 | 3 | 4 | 5 | 6 | 7 | 8 |
|---|---|---|---|---|---|---|---|---|---|
| Coating Composition | | | | | | | | | |
| Monomer 1 | Composition | HEMA | HEMA | HEMA | HEMA | HEMA | HEMA | HEMA | HEA |
| | % Wt. | 76.9 | 76.9 | 76.9 | 57.7 | 76.9 | 76.9 | 71.0 | 71.0 |
| Monomer 2 | Composition | — | — | — | — | — | — | — | — |
| | % Wt. | — | — | — | — | — | — | — | — |
| Oligomer 1 | Composition | 3201 | 3600 | 3700 | 3701 | 3702 | 3703 | 3201 | 3201 |
| | % Wt. | 19.2 | 19.2 | 19.2 | 38.5 | 19.2 | 19.2 | 26.5 | 26.5 |
| Oligomer 2 | Composition | — | — | — | — | — | — | — | — |
| | % Wt. | — | — | — | — | — | — | — | — |
| Photoinitiator | % Wt. | 3.8 | 3.8 | 3.8 | 3.8 | 3.8 | 3.8 | 2.5 | 2.5 |
| Surfactant | Composition | — | — | — | — | — | — | — | — |
| | % Wt. | — | — | — | — | — | — | — | — |
| Coating Properties | | | | | | | | | |
| Uncured Liquid | | | | | | | | | |
| Viscosity, cP | | 16.9 | 22.7 | 23.1 | 107 | 23.9 | 25.0 | 19.6 avg. | 15.3 |
| Surface Tension, dyne/cm | | — | 38.9 | 39.0 | — | 38.4 | 38.5 | 38.4 | — |
| Cured Solid Coating | | | | | | | | | |
| Hardness | | H | 3H | HB | H | HB | H | HB | F |
| Flexibility | | — | 4 | 4 | 4 | 4 | — | 1 | 1 |
| Adhesion | | 4 | 4 | 4 | 4 | 4 | 4 | 4 | 4 |
| Surface Texture | | 0 | 1 | 1 | 0 | 1 | 1 | 1 | 0 |
| No. of Passes to Cure | | 2 | 2 | 2 | 1 | 2 | 2 | 2 | 1 |

| EXAMPLE NO. | | 9 | 10 | 11 | 12 | 13 | 14 | 15 | 16 | 17 |
|---|---|---|---|---|---|---|---|---|---|---|
| Coating Composition | | | | | | | | | | |
| Monomer 1 | Composition | HEA | HEA | HEA | HEA | HEA | HEA | HEA | HEA | HEA |
| | % Wt. | 65.8 | 65.6 | 65.0 | 71.0 | 78.3 | 78.3 | 76.9 | 76.9 | 76.9 |
| Monomer 2 | Composition | — | — | — | — | — | — | — | — | — |
| | % Wt. | — | — | — | — | — | — | — | — | — |
| Oligomer 1 | Composition | 3201 | 3201 | 3201 | 3701 | 3702 | 3703 | 3600 | 3700 | 3600 |
| | % Wt. | 32.0 | 31.9 | 31.6 | 26.5 | 19.2 | 19.2 | 19.2 | 19.2 | 19.2 |

TABLE 1-continued

EFFECT OF COMPOSITIONAL VARIABLES ON COATING PROPERTIES

|  |  |  |  |  |  |  |  |  |  |  |
|---|---|---|---|---|---|---|---|---|---|---|
| Oligomer 2 | Composition | — | — | Parlon-5 | — | — | — | — | — | — |
|  | % Wt. | — | — | 1.0 | — | — | — | — | — | — |
| Photoinitiator | % Wt. | 2.2 | 2.5 | 2.5 | 2.5 | 2.5 | 2.5 | 2.5 | 2.5 | 2.5 |
| Surfactant | Composition | — | — | — | — | — | — | — | — | FC-430 |
|  | % Wt. | — | — | — | — | — | — | — | — | 1.0 |
| Coating Properties |  |  |  |  |  |  |  |  |  |  |
| Uncured Liquid |  |  |  |  |  |  |  |  |  |  |
| Viscosity, cP |  | 22.1 | 21.8 | Incompatible | 28.2 | 16.9 | 17.5 | — | — | — |
| Surface Tension, dyne/cm |  | — | — |  | — | — | — | — | — | — |
| Cured Solid Coating |  |  |  |  |  |  |  |  |  |  |
| Hardness |  | 2B | 2B < 3B |  | H | H | HB | H | H-2H | H |
| Flexibility |  | — | 1 |  | 1 | 1 | 0 | 1 | 1 | 1 |
| Adhesion |  | — | 3 |  | 4 | 4 | 2 | 4 | 4 | 4 |
| Surface Texture |  | 0 | 1 |  | 3 | 1 | 3 | 3 | 3 | 0 |
| No. of Passes to Cure |  | 2 | 1 |  | 1 | 1 | 1 | 1 | 1 | 1 |
| EXAMPLE NO. |  | 18 | 19 | 20 | 21 | 22 | 23 | 24 | 25 | 26 | 27 |
| Coating Composition |  |  |  |  |  |  |  |  |  |  |  |
| Monomer 1 | Composition | HEA | 2-HPA | HEMA | HEA | HEA | HEA | HEMA | HEMA | HEA | HEA |
|  | % Wt. | 64.1 | 78.0 | 76.9 | 76.9 | 76.9 | | 76.9 | 76.9 | 82.0 | 82.0 |
| Monomer 2 | Composition | HDODA* | — | — | — | — | — | — | — | — | — |
|  | % Wt. | 16.7 | — | — | — | — | — | — | — | — | — |
| Oligomer 1 | Composition | 3600 | 3600 | 6700 | 6700 | UV893 | UV783 | 1700 | 7100 | 7100 | 1700 |
|  | % Wt. | 16.0 | 19.5 | 19.2 | 19.2 | 19.2 | | 19.2 | 19.2 | 15.5 | 15.5 |
| Oligomer 2 | Composition | — | — | — | — | — | — | — | — | — | — |
|  | % Wt. | — | — | — | — | — | — | — | — | — | — |
| Photoinitiator | % Wt. | 2.1 | 2.5 | 3.8 | 2.5 | 3.8 | 3.8 | 3.8 | 3.8 | 3.8 | 2.5 |
| Surfactant | Composition | FC-430 | — | — | — | — | — | — | — | — | — |
|  | % Wt. | 0.8 | — | — | — | — | — | — | — | — | — |
| Coating Properties |  |  |  |  |  |  |  |  |  |  |  |
| Uncured Liquid |  |  |  |  |  |  |  |  |  |  |  |
| Viscosity, cP |  | 13.2 | 19.7 | 33.2 | 23.7 | 27.0 | 26.7 | 39.5 | 36.7 | 12.6 | 24.2 |
| Surface Tension, dyne/cm |  | — | — | — | — | — | — | — | — | — | — |
| Cured Solid Coating |  |  |  |  |  |  |  |  |  |  |  |
| Hardness |  | H | H | H | H | <4B | <4B | H | H | B | 2B |
| Flexibility |  | 1 | 1 | — | 1 | 0 | 0 | 4 | 4 | 1 | 1 |
| Adhesion |  | 4 | 3 | 4 | 4 | 1 | 1 | 4 | 4 | 2-3 | 3 |
| Surface Texture |  | 0 | 3 | 1 | 3 | 0 | 0 | 1 | 0 | 1 | 1 |
| No. of Passes to Cure |  | 1 | 1 | 2 | 1 | 5 | 3 | 3 | 2 | 1 | 1 |

*1,6-hexanedioldiacrylate

Examples 1-19 all exhibited excellent adhesion of the compositions using hydroxy-lower alkyl acrylates with epoxy oligomers. Likewise, Examples 20 and 21 showed excellent adhesion of the composition using hydroxy-lower alkyl acrylates with acrylate oligomers. Examples 22 and 23, in which the oligomer was a urethane, did not show good adhesion because the cured coatings were too soft. However, Examples 24-27 in which HEMA was used as the monomer showed quite good hardness and thus excellent adhesion.

| Glossary of Tradenames | | |
|---|---|---|
| Tradename | Goods | Source |
| Celrad | Acrylated oligomers | Celanese Corp. New York, NY |
| Fluorad | Fluorinated acrylate ester oligomer | Minnesota Mining and Manufacturing Company St. Paul, MN |
| UV (Urithane) | Acrylated urethane oligomers | Thiokol Corp. Danvers, MA |

I claim:

1. An optical recording medium comprising a dimensionally stable substrate, a layer of light-absorptive material, and an optical layer coated on the light-absorptive layer by a method comprising the sequential steps of:
   1. applying to the light-absorptive layer a liquid layer of a coating composition comprising a solution of:
      a. liquid photohardenable hydroxy-lower alkyl monoacrylate having 1 to 3 carbons in said alkyl group having dissolved therein
      b. oligomer having a molecular weight of at least 500; and
      c. 0.05-10% wt. photoinitiator system, the liquid uncured solution having a viscosity of at least 10 cP and surface tension of less than 36 dynes/cm at coating temperature and the solid cured composition having a transmissivity of at least 88% to light having a wavelength of 488-830 nm; and
   2. exposing the coated layer to actinic radiation for a time sufficient to effect substantially complete photohardening of the monoacrylate.

2. The optical medium of claim 1 in which the monoacrylate component a. of the coating composition is selected from the group consisting of 2-hydroxyethyl acrylate, 2-hydroxyethyl methacrylate and mixtures thereof.

3. The optical medium of claim 1 in which the oligomer component b. of the coating composition is acrylated epoxy resin.

4. The optical medium of claim 1 in which the coating composition has a non-ionic surfactant dissolved therein.

5. The optical medium of claim 4 in which the surfactant component of the coating composition is a fluorinated acrylate ester oligomer.

6. The optical medium of claim 1 in which the viscosity of the liquid uncured solution at the coating temperature is 10-100 cP and the liquid uncured solution is applied by spin coating.

7. The medium of claim 1 in which the light-absorptive layer is a thin layer of polymeric dye.

8. The medium of claim 7 in which the substrate is a layer of polymer coated on aluminum.

* * * * *